United States Patent
Kesavan et al.

[11] Patent Number: 5,971,113
[45] Date of Patent: Oct. 26, 1999

[54] COATED FRICTION PAD FOR BRAKE ASSEMBLY

[75] Inventors: Sunil Kumar Kesavan, Troy; Delwyn William Saiter, Jr., Oxford, both of Mich.

[73] Assignee: AlliedSignal Inc., Morristown, N.J.

[21] Appl. No.: 08/814,066

[22] Filed: Mar. 10, 1997

[51] Int. Cl.$^6$ .................................................... F16D 69/00
[52] U.S. Cl. ................................. 188/251 A; 188/251 M
[58] Field of Search ........................... 188/251 A, 251 M, 188/73.1, 370, 218 XL; 523/157, 149, 153; 106/36; 428/323, 552; 192/107 M, 107 R

[56] References Cited

U.S. PATENT DOCUMENTS

| | | | |
|---|---|---|---|
| 3,523,595 | 8/1970 | Massmann . | |
| 3,899,050 | 8/1975 | Savary et al. . | |
| 4,178,278 | 12/1979 | Reynolds, Jr. | 523/157 |
| 4,226,758 | 10/1980 | Sumira | 523/153 |
| 4,290,510 | 9/1981 | Warren | 188/218 XL |
| 4,593,802 | 6/1986 | Danko, Jr. | 192/107 M |
| 4,926,978 | 5/1990 | Shibata et al. | 188/73.1 |
| 5,569,543 | 10/1996 | Schaffer, Jr. et al. | 428/552 |
| 5,573,579 | 11/1996 | Nakanishi et al. | 106/36 |
| 5,643,663 | 7/1997 | Bommier et al. | 428/317.9 |
| 5,712,029 | 1/1998 | Tsugawa et al. | 428/323 |
| 5,753,725 | 5/1998 | Kondoh et al. | 523/149 |

*Primary Examiner*—Robert J. Oberleitner
*Assistant Examiner*—Melanie Talayera

[57] ABSTRACT

A friction pad for a brake assembly is disclosed. The pad comprises a friction material having a surface adapted for contact with a brake component such as a rotor or drum. The surface has a coating thereon, which comprises abrasive particles having a Mohs hardness of 5.5 to 7.5 and abrasive particles having a Mohs hardness of 8.0 to 9.5.

15 Claims, No Drawings

COATED FRICTION PAD FOR BRAKE ASSEMBLY

FIELD OF THE INVENTION

This invention relates to friction materials in general, and specifically to coated friction pads for brake assemblies.

BACKGROUND OF THE INVENTION

Brakes in automobiles or other motor vehicles generally include a friction material and a counter-friction material such as a rotor or drum. The rotor or drum is generally steel or other metal material having a surface thereon adapted for contact with a friction material. The brake pad which is usually a steel or other substrate having a friction material thereon, the surface of the friction material being adapted for contact with the friction surface of the rotor or drum.

One problem with metal rotors and drums is that they are susceptible to oxidation or corrosion. If the brakes are used often, this problem is not too severe as the friction between the rotor or drum and the brake pad is usually sufficient to remove any thin film of oxidation or corrosion. However, if the brakes are not used for a substantial period of time, such as on a new vehicle kept in a seller's lot, the resulting buildup of oxidation or corrosion on the rotor's or drum's friction surface can adversely affect the performance of the brake. The corrosion can become so severe that it results in pitting or scarring of the rotor or drum surface, which can render the rotor unsuitable for achieving the desired braking performance. In some instances, the corrosion can cause the rotor or drum to bond to the friction pad, which can result in cohesive failure of the friction pad or separation of the pad from its substrate.

One solution to this problem is to use rotors that have been coated or otherwise surface treated to inhibit corrosion of the rotor. Such treatments include oil or grease or the like, electrodeposition coatings such as cathodic electrodeposition of amine-salted epoxy resins curable with isocyanate crosslinkers, other curable coatings such as melamine-cured OH-functional acrylic coatings, thermoplastic coatings such as high-molecular weight acrylic or polyurethane latexes or oil-based alkyd coatings, metal oxide coatings where a thin film of oxidation is allowed to form without pitting, and inorganic coatings such as zinc particles dispersed in a potassium silicate solution.

A problem with treated rotors is that although they are resistant to corrosion, the treated surface often does not provide adequate braking performance, especially when matched with a friction material on the brake pad that is itself designed for use with the underlying metal out of which the rotor is made.

It has been proposed to provide an abrasive coating on the brake pad that would have the effect of removing a protective varnish coating on the rotor during the initial break-in period of the brakes (e.g, during the first 200 brake applications). For example, it has been proposed to use a coating of abrasive carborundum particles on the brake pad for this purpose. Such a coating, however, produces an undesired increase in the new or 'green' friction of the brakes, resulting in unpredictable, noisy, or 'sticky' braking action. Also, with such coatings containing high levels of aggressive abrasive particles, enough particles can embed in the surface of the pad so as to prolong the undesirable performance characteristics.

It is thus an object of this invention to provide a brake pad that can remove a corrosion-resistant coating from a rotor during the initial break-in period of the brakes. It is a further object of the invention to provide a brake pad that maintains good braking performance both during and after the break-in period.

SUMMARY OF THE INVENTION

According to the present invention, there is provided a friction pad for a brake assembly. The pad comprises a friction material having a surface adapted for contact with a brake rotor or drum. The surface has a coating thereon, which comprises abrasive particles having a Mohs hardness of 5.5 to 7.5 and abrasive particles having a Mohs hardness of 8.0 to 9.5.

The present invention thus provides a brake pad that can remove a corrosion-resistant coating from a rotor or drum during the initial break-in period of the brakes while maintaining good braking performance both during and after the break-in period.

DESCRIPTION OF THE PREFERRED EMBODIMENTS

The friction pad of the present invention comprises a friction material having a surface adapted for contact with a brake rotor or drum and an abrasive coating on that surface. The friction material can be virtually any type of material that is useful in brake systems, such as semi-metallic friction materials, low-metallic friction materials, asbestos organics, ceramets, and others as are known in the art.

Friction materials useful in the practice of the invention generally contain one or more thermosetting resinous binders (e.g., phenolic resins such as phenol-formaldehyde resins, epoxies), reinforcing fibers (e.g., aramid, steel, acrylic, and, although no longer widely used, asbestos), metal powders (e.g., iron, copper, brass, zinc, aluminum, antimony, and the like), solid lubricants (e.g., molybdenum disulfide, graphite, coke, stannic sulfide, antimony trisulfide), abrasives (e.g., tin oxide, magnesia, silica, iron oxide, alumina, rutile, and the like), organic fillers (e.g., rubber particles, cashew nut shell particles, nitrile rubber particles), and inorganic fillers (e.g., barytes, gypsum, mica, titanates, and the like). Other materials and additives may be added as well, as is known in the art.

The coating contains abrasive particles having a Mohs hardness of 5.5 to 7.5, preferably 6.0 to 7.0, and abrasive particles having a Mohs hardness of 8.0 to 9.5, preferably 8.5 to 9.0. Examples of useful particles having a Mohs hardness of 5.5 to 7.5 include rutile, ground pumice, tin oxide, magnesium oxide, silica, and iron oxide.

Examples of useful particles having a Mohs hardness of 8.0 to 9.5 include silicon carbide, alumina, quartz, carborundum, corundum, zirconium sand, and the like. The particles can have a mean average diameter (average diameter of a particle is defined as the diameter of a spherical particle. having the same mass as the particle in question, and mean average diameter is the statistical mean of average diameters in a population of particles) of 2 $\mu$m to 300 $\mu$m and preferably 2 $\mu$m to 75 $\mu$m.

In a preferred embodiment of the invention, the particles are incorporated into a coating composition along with a polymer or resinous binder, which can be applied to the surface of the friction material. Such a coating composition can comprise from 5 to 75 weight percent, preferably 5 to 60 weight percent, and more preferably of 5 to 50 weight percent of abrasive particles having a Mohs hardness of 5.5 to 7.5 and from 5 to 85 weight percent, preferably 5 to 50 weight percent, and more preferably 10 to 50 weight percent of abrasive particles having a Mohs hardness of 8.0 to 9.5, based on the dry weight of the coating.

A variety of binders may be used in the abrasive coating composition according to the invention. Preferably, the binder is stable up to temperatures of 350° C., but degrades and/or chars slowly at temperatures above 350° C.

This assists in enabling the abrasive layer to be consumed during the desired break-in period of the brakes. The binder should also be capable of adhering to the friction material, although this is not necessary if the coating composition contains other adhesive additives or if an adhesive primer is applied to the friction material prior to application of the abrasive coating composition. Useful binders include epoxy resins (e.g., novolaks, Epon® resins (Shell Chemical Co.)), polyurethane resins, polyester resins, phenolic resins, modified phenolic resins such as nitrile/phenolic resins, silicones, alkyd resins, and other resins known to be useful in coating compositions. Other known coating additives, such as surfactants, dyes or pigments, viscosity or rheology modifiers, flow control agents, stabilizers, and the like, may also be included in the coating composition as is known in the art.

The coating composition can be applied so as to result in a dried or cured layer having a thickness of 0.025 mm to 1.3 mm, and preferably 0.025 mm to 0.13 mm. The coating composition can be applied to the friction material by any of a variety of well-known techniques. Such techniques include silk screening, roller coating, brush coating, dip coating, and spray coating (as long as the abrasive particle sizes are compatible with the spray equipment).

Other alternative application methods exist as well. For example, instead of incorporating the abrasive particles into a coating composition for application onto the surface of the friction material, the friction material can be coated with a thin layer of adhesive, followed by dusting of the wet or uncured adhesive with the abrasive particles.

In one preferred embodiment of the invention, the coated friction pad is used in a brake assembly in combination with a counter friction element such as a brake rotor or drum having a surface adapted for contact with said friction pad wherein the counter friction element surface has a protective coating thereon capable of inhibiting oxidation or corrosion of the rotor or drum. Disc brake rotors can be relatively more highly susceptible to corrosion than other brake drums, so, in a preferred embodiment of the invention, the counter friction element is a disc brake rotor.

Materials useful for the main body of the counter friction element are well-known in the art, and include cast iron, stainless steel, and the like, or composites (e.g., aluminum metal matrix composite). Protective coatings for rotors and drums are known in the art, and include oil or grease or the like, electrodeposition coatings such as cathodic electrodeposition of amine-salted epoxy resins, which may be cured with isocyanate crosslinkers, other curable coatings such as melamine-cured OH-functional polyester, polyurethane, or acrylic coatings, thermoplastic coatings such as high-molecular weight acrylic or polyurethane latexes or oil-based alkyd coatings, metal oxide coatings where a thin film of oxidation is allowed to form on the surface of the rotor or drum without pitting, and inorganic coatings such as zinc, magnesium, and/or aluminum particles dispersed in a silicate solution such as potassium silicate solution.

The invention is further described in the following examples.

Preparation 1

A coating composition was prepared with the following ingredients:

TABLE 1

| Component | Weight Percent |
| --- | --- |
| nitrile/phenolic water-based adhesive (70% solids) | 48 |
| rutile (−200 mesh) (Mohs hardness 6.0–6.5) | 40 |
| alumina (−100 mesh) (Mohs hardness 9.0–9.5) | 10 |
| rheology modifier | 1 |
| surfactant | 1 |

Dry ingredients were added to a five gallon mixing drum according to the Table 1 and weighed on a scale having one gram resolution. Liquid ingredients were weighed using another suitable container, such that total mass of the solid and liquid components was 4.0 kg. Using an agitating tilt mixer, the liquid components were added into the mixing drum containing the dry components over a ten minute mixing cycle. Specific gravity of the coating composition was recorded, with a target value of 1.55 g/cm$^3$. Viscosity of the mixture was also measured in order to assure that it fell within the acceptable limits of 5,000–9,000 cps for the silk screen application process described below in Examples 1 and 2. Note that for Examples 3 and 4 below which used a transfer roll application, the desired viscosity was approximately 6,000 cps.

EXAMPLE 1

The coating described in Preparation 1 was applied as a uniform layer to the surface of a friction pad using a silk-screen printing process such that said layer covered only the surface of the pad with no drips or runs into slots or over edges. Friction pads were then given a flash-off time of 10 minutes, followed by a curing cycle in a standard industrial convection oven which brought the surface of the pad to between 235 and 250° C. in 60–70 seconds time as measured by a thermocouple placed in the center of the friction pad flush to the surface. Only minimal discontinuities such as streaking or breaking in the surface of the coated pad after curing were allowed.

EXAMPLE 2

The coating described in Preparation 1 was applied as in Example 1, with the oven curing cycle replaced by an infrared oven curing cycle which produced the same surface temperature profile.

EXAMPLE 3

The coating described in Preparation 1 was applied using a transfer roll system with the gap between the roll and pad surface set between 0.010"and 0.012". This gap was adjusted in order to create the best overall coating appearance and weight. No flash-off time was required using this method, and using an infrared oven the parts were cured as described in Example 1.

EXAMPLE 4

The coating described in Preparation 1 was applied using a transfer roll system as in Example 3, and cured as described in Example 2.

Preparation 2

A coating composition was prepared with the following ingredients:

Comparative Preparation A

In order to demonstrate the performance of the invention described herein, a coating composition was prepared with the following ingredients:

TABLE 1

| Component | Weight Percent |
| --- | --- |
| nitrile/phenolic water-based adhesive (70% solids) | 50 |
| silicon carbide (400 grit) (Mohs hardness 9.5) | 40 |
| alumina (−100 mesh) (Mohs hardness 9.0–9.5) | 10 |

The comparative coating composition, unlike the coatings prepared according to the invention, did not contain any abrasive particles with a Mohs hardness between 5.5 and 7.5.

Dry ingredients were added to a five gallon mixing drum according to the layout sheet and weighed on a scale having one gram resolution. Liquid ingredients were weighed using another suitable container, such that total mass of the solid and liquid components was 4.0 kg. Using an agitating tilt mixer, the liquid components were added into the mixing drum containing the dry components over a ten minute mixing cycle. Specific gravity of the coating composition was recorded, with a target value of 1.55 g/cm$^3$. Viscosity of the mixture was also measured in order to assure that it fell within the acceptable limits of 5,000–9,000 cps for the silk screen application process described below in Examples 1 and 2. Note that for Examples 2 and 4 below which used a transfer roll application, the desired viscosity was approximately 6,000 cps.

Comparative Example A

The coating described in Preparation A was applied as a uniform layer to the surface of a friction pad using a silk-screen printing process such that said layer covered only the surface of the pad with no drips or runs into slots or over edges. Friction pads were then given a flash-off time of 10 minutes, followed by a curing cycle in a standard industrial convection oven which brought the surface of the pad to between 235 and 250° C. in 60–70 seconds time as measured by a thermocouple placed in the center of the friction pad flush to the surface. Only minimal discontinuities such as streaking or breaking in the surface of the coated pad after curing were allowed.

Comparative Example B

The coating described in Preparation A was applied as in Example A, with the oven curing cycle replaced by an infrared oven curing cycle which produced the same surface temperature profile.

Comparative Example C

The coating described in Preparation A was applied using a transfer roll system with the gap between the roll and pad surface set between 0.010" and 0.012". This gap was adjusted in order to create the best overall coating appearance and weight. No flash-off time was required using this method, and using an infrared oven the parts were cured as described in Example A.

Comparative Example D

The coating described in Preparation 1 was applied using a transfer roll system as in Example C, and cured as described in Example B.

TABLE 2

| Component | Weight Percent |
| --- | --- |
| nitrile/phenolic water-based adhesive (70% solids) | 30 |
| volcanic pumice (−100 mesh) (Mohs hardness 6.0) | 20 |
| silicon carbide (400 grit) (Mohs hardness 9.5) | 10 |
| alumina (−100 mesh) (Mohs hardness 9.0–9.5) | 20 |
| rutile (−200 mesh) (Mohs hardness 6.0–6.5) | 9 |
| propylene glycol | 5 |
| surfactant | 1 |
| dye | 5 |

Dry ingredients were added to a five gallon mixing drum according to the Table 2 and weighed on a scale having one gram resolution. Liquid ingredients were weighed using another suitable container, such that total mass of the solid and liquid components was 4.0 kg. Using an agitating tilt mixer, the liquid components were added into the mixing drum containing the dry components over a ten minute mixing cycle. Specific gravity of the coating composition was recorded, with a target value of 1.55 g/cm$^3$. Viscosity of the mixture was also measured in order to assure that it fell within the acceptable limits of 5,000–9,000 cps for the silk screen application process described below in Examples 5 and 6. Note that for Examples 7 and 8 below which used a transfer roll application, the desired viscosity was approximately 6,000 cps.

EXAMPLE 5

The coating described in Preparation 2 was applied as a uniform layer to the surface of a friction pad using a silk-screen printing process such that said layer covered only the surface of the pad with no drips or runs into slots or over edges. Friction pads were then given a flash-off time of 10 minutes, followed by a curing cycle in a standard industrial convection oven which brought the surface of the pad to between 235 and 250° C. in 60–70 seconds time as measured by a thermocouple placed in the center of the friction pad flush to the surface. Only minimal discontinuities such as streaking or breaking in the surface of the coated pad after curing were allowed.

EXAMPLE 6

The coating described in Preparation 2 was applied as in Example 5, with the oven curing cycle replaced by an infrared oven curing cycle which produced the same surface temperature profile.

EXAMPLE 7

The coating described in Preparation 2 was applied using a transfer roll system with the gap between the roll and pad surface set between 0.010" and 0.012". This gap was adjusted in order to create the best overall coating appearance and weight. No flash-off time was required using this method, and using an infrared oven the parts were cured as described in Example 5.

EXAMPLE 8

The coating described in Preparation 1 was applied using a transfer roll system as in Example 7, and cured as described in Example 6.

Comparative Testing

The pad of Example 1 having a coating according to the invention, the pad of Comparative Example A, and a control pad having no coating at all. The pads were matched with a zinc silicate coated steel rotor so that the friction material and steel would have a target coefficient of friction ($\mu$) between 0.3 and 0.4, and the pad/rotor assemblies were subjected to repeated stop testing on a dynamometer. The results of this testing are shown in Table 4, which show the mean coefficient of friction exhibited during stop numbers 1, 10, 20, 40, 100, and 200, with the stop number indicated in parentheses after the '$\mu$' in each column heading.

TABLE 4

| Example | $\mu$ (1) | $\mu$ (10) | $\mu$ (20) | $\mu$ (40) | $\mu$ (100) | $\mu$ (200) |
|---|---|---|---|---|---|---|
| Control | 0.27 | 0.22 | 0.31 | 0.35 | 0.36 | 0.38 |
| 1 | 0.32 | 0.37 | 0.35 | 0.34 | 0.35 | 0.35 |
| A | 0.30 | 0.38 | 0.53 | 0.54 | 0.54 | 0.54 |

As shown by the data in Table 4, the control exhibited an undesirably low coefficient of friction during the first 20 stops due to the effect of the rotor's zinc silicate coating on the uncoated friction pad. The brake pad of Example 1, however, provided consistent friction performance within the desired range throughout the testing. Comparative Example A, on the other hand, exhibited a sharp rise in friction performance, resulting in an unacceptably high coefficient of friction after the first 10 stops through completion of the test at 200 stops. Additionally, although not shown in mean friction values of Table 4, the range of the coefficient of friction experienced during each of the stops was undesirably higher for Comparative Example A than for Example 1.

The invention has been described in detail herein with reference to specific embodiments thereof. It is to be understood that modifications and variations from these embodiments may be made within the spirit and scope of the invention.

What is claimed is:

1. A friction pad for a brake assembly, said pad comprising a friction material having a surface adapted for contact with a brake counter-friction element, having a coating on said surface, said coating comprising abrasive particles having a Mohs hardness of 5.5 to 7.5 and abrasive particles having a Mohs hardness of 8.0 to 9.5.

2. A friction pad according to claim 1 wherein said coating comprises abrasive particles having a Mohs hardness of 6.0 to 7.0 and abrasive particles having a Mohs hardness of 8.5 to 9.0.

3. A friction pad according to claim 1 wherein said coating has a thickness of 0.025 mm to 1.3 mm.

4. A friction pad according to claim 3 wherein said coating has a thickness of 0.025 mm to 0.13 mm.

5. A friction pad according to claim 1 wherein said abrasive particles have a mean diameter of from 2 $\mu$m to 300 $\mu$m.

6. A friction pad according to claim 1 wherein said abrasive particles have a mean diameter of from 2 $\mu$m to 75 $\mu$m.

7. A friction pad according to claim 1 wherein said coating comprises abrasive particles in a polymer binder.

8. A friction pad according to claim 7 wherein said binder is a phenolic resin.

9. A friction pad according to claim 1 wherein said coating comprises from 5 to 75 weight percent of abrasive particles having a Mohs hardness of 5.5 to 7.5 and from 5 to 85 weight percent of abrasive particles having a Mohs hardness of 8.0 to 9.5.

10. A friction pad according to claim 1 wherein said coating comprises from 5 to 60 weight percent of abrasive particles having a Mohs hardness of 5.5 to 7.5 and from 10 to 50 weight percent of abrasive particles having a Mohs hardness of 8.0 to 9.5.

11. A friction pad according to claim 1 having a surface adapted for contact with a disc brake rotor.

12. A brake assembly comprising a friction pad according to claim 1 and a counter friction element having a surface adapted for contact with said friction pad, said counter friction element surface having thereon a coating capable of inhibiting corrosion of the counter friction element.

13. A brake assembly according to claim 12 wherein said corrosion-inhibiting coating is an inorganic coating.

14. A brake assembly according to claim 13 wherein said inorganic coating is a zinc silicate coating.

15. A brake assembly according to claim 12 wherein said counter friction element is a disc brake rotor.

* * * * *